US010782212B2

(12) United States Patent
Aggarwal et al.

(10) Patent No.: US 10,782,212 B2
(45) Date of Patent: Sep. 22, 2020

(54) PARTICULATE MATTER SAMPLER

(71) Applicant: Council of Scientific & Industrial Research, New Delhi (IN)

(72) Inventors: Shankar G. Aggarwal, New Delhi (IN); Prashant Patel, New Delhi (IN); Chuen Jinn Tsai, Hsinchu (TW); Daya Soni, New Delhi (IN); Khem Singh, New Delhi (IN); Ravinder Kumar Kotnala, New Delhi (IN); Tomoaki Okuda, Yokohama (JP); Prabhat Kumar Gupta, New Delhi (IN); Vijay Narain Ojha, New Delhi (IN); Dinesh Kumar Aswal, New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 232 days.

(21) Appl. No.: 15/954,097

(22) Filed: Apr. 16, 2018

(65) Prior Publication Data
US 2018/0299356 A1    Oct. 18, 2018

(30) Foreign Application Priority Data
Apr. 17, 2017    (IN) .............................. 201711013523

(51) Int. Cl.
*G01N 1/22*    (2006.01)
*G01F 1/00*    (2006.01)

(52) U.S. Cl.
CPC .............. *G01N 1/2247* (2013.01); *G01F 1/00* (2013.01); *G01N 1/2205* (2013.01);
(Continued)

(58) Field of Classification Search
CPC .. G01N 1/2247; G01N 1/2005; G01N 1/2208; G01N 2001/2223; G01N 2001/227; G01F 1/00
See application file for complete search history.

(56) References Cited

U.S. PATENT DOCUMENTS 4,566,342 A *  1/1986  Kurz .................... G01N 1/2035
                                                    73/863.03
6,167,107 A *  12/2000  Bates ................... G01N 1/2247
                                                    377/10
(Continued)

OTHER PUBLICATIONS

Peters, T.M. et al. 2001 "Design and Calibration of the EPA $PM_{2.5}$ Well Impactor Ninety-Six (WINS)" *Aerosol Science and Technology* 34: 389-397.

*Primary Examiner* — Herbert K Roberts
*Assistant Examiner* — John M Royston
(74) *Attorney, Agent, or Firm* — Knobbe, Martens, Olson and Bear, LLP

(57) ABSTRACT

A sampler apparatus is disclosed. The sampler apparatus comprises an impactor assembly comprising a nozzle plate, an impaction plate, and a filter unit. The nozzle plate comprises a plurality of nozzles for channelling an air stream through the sampler apparatus. The impaction plate is adapted to collect particulate matter having size equal to or greater than a threshold size. The filter unit is adapted to collect particulate matter having size less than or equal to the threshold size. The sampler apparatus further comprises a control assembly coupled with the impactor assembly. The control assembly comprises one or more flow control devices to maintain a predetermined air-flow rate of the air stream within the sampler apparatus.

10 Claims, 7 Drawing Sheets

(52) U.S. Cl.
CPC ..... *G01N 1/2208* (2013.01); *G01N 2001/227* (2013.01); *G01N 2001/2223* (2013.01)

(56) References Cited

U.S. PATENT DOCUMENTS

| | | | |
|---|---|---|---|
| 6,431,014 B1* | 8/2002 | Liu | G01N 1/2208 73/28.05 |
| 2005/0028616 A1* | 2/2005 | Marple | G01N 1/2208 73/863.22 |
| 2005/0279181 A1* | 12/2005 | Trakumas | G01N 1/2208 73/863.22 |
| 2013/0036837 A1* | 2/2013 | Tsai | G01N 1/2208 73/863.22 |
| 2013/0188040 A1* | 7/2013 | Kamen | G06F 19/3418 348/135 |

* cited by examiner (b)

PARTICULATE MATTER SAMPLER

FIELD OF THE INVENTION

The present invention relates to sampling of air, and more particularly to separation and collection of particulate matter (PM) fractions from air.

BACKGROUND OF THE INVENTION

Particulate matter (PM)/aerosols that have an aerodynamic size equal to or less than 2.5 micrometre (μm) are referred to as "$PM_{2.5}$". $PM_{2.5}$ are one of the criteria pollutants listed in National Ambient Air Quality Standards (NAAQS) owing to their harmful effects, for example, penetration into lungs, impact on visibility, impact on local weather conditions, and the like. In addition, because of their adverse health and climate effect, air quality of a station, which is generally expressed in terms of Air Quality Index (AQI), is significantly governed by the aforementioned criteria pollutant.

Thus, reliable and traceable measurement of $PM_{2.5}$ is very important to better understand the air quality and its consequences, and thus to make a better control policy. Moreover, because for health effect studies, particle size and its chemistry both matter and particle chemical composition determination is an equally important task. Furthermore, to make a perfect control policy of $PM_{2.5}$, it is also very important to know the correct sources of particulate pollution, especially in an urban environment. Therefore, chemical analysis of tracers in particulate material is an important task.

SUMMARY OF THE INVENTION

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

According to an embodiment of the present subject matter, a sampler apparatus is disclosed. The sampler apparatus comprises an impactor assembly comprising a nozzle plate, an impaction plate, and a filter unit. The nozzle plate comprises a plurality of nozzles for channelling an air stream through the sampler apparatus. The impaction plate is adapted to collect particulate matter having size equal to or greater than a threshold size. The filter unit is adapted to collect particulate matter having size less than or equal to the threshold size. The sampler apparatus further comprises a control assembly coupled with the impactor assembly. The control assembly comprises one or more flow control devices to maintain a predetermined air-flow rate of the air stream within the sampler apparatus.

The details of one or more embodiments of the present subject matter are set forth in the accompanying drawings and the description below. Other features, objects, and advantages of the invention will be apparent from the description and drawings, and from the claims.

DESCRIPTION OF DRAWINGS

To further clarify advantages and aspects of the invention, a more particular description of the invention will be rendered by reference to specific embodiments thereof, which are illustrated in the appended drawings, wherein.

Figure 1:
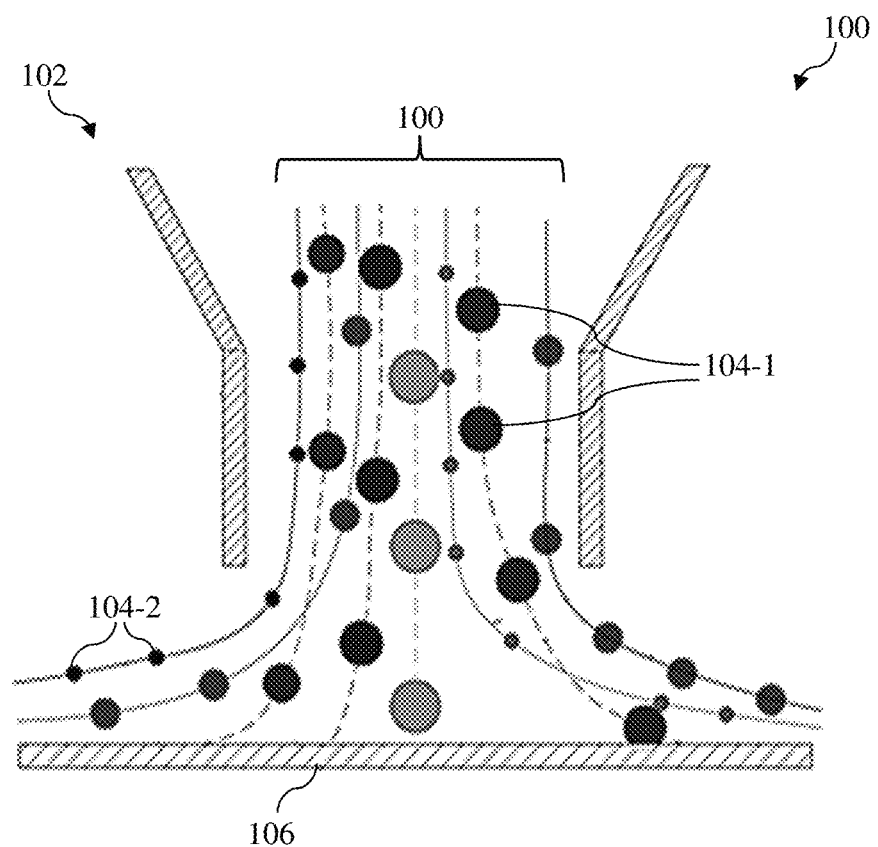
FIG. 1 illustrates working principle of an impactor assembly of a sampler apparatus.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the invention. Furthermore, the one or more elements may have been represented in the drawings by conventional symbols, and the drawings may show only those specific details that are pertinent to understanding the embodiments of the invention so as not to obscure the drawings with details that will be readily apparent to those of ordinary skill in the art having benefit of the description herein.

DETAILED DESCRIPTION

For the purpose of promoting an understanding of the principles of the present subject matter, reference will now be made to the embodiment illustrated in the drawings and specific language will be used to describe the same. It will nevertheless be understood that no limitation of the scope of the present subject matter is thereby intended, such alterations and further modifications in the illustrated system, and such further applications of the principles of the present subject matter as illustrated therein being contemplated as would normally occur to one skilled in the art to which the invention relates. It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present subject matter. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting. Embodiments of the present invention will be described below in detail with reference to the accompanying drawings.

FIG. 1 illustrates working principle of a sampler apparatus. As shown in the figure, ambient air 100 enters into an impactor assembly (not shown in the figure) of the sampler apparatus through a set of nozzles, provided on a nozzle plate (not shown in the figure), with a predefined flow rate. In an example, the predefined flow rate may be 68 m³/h or 40 cubic feet per meter (CFM). For the sake of brevity, only a single nozzle 102 is shown in the figure.

Particles 104 are accelerated as they pass through the nozzles 102 toward an impaction plate 106. Because of their momentum, particles 104-1 having aerodynamic diameters larger than 2.5 µm are impacted on the impaction plate 106. While smaller particles 104-2, i.e. particles having aerodynamic size≤2.5 µm follow the air stream in such a way that re-entrainment of impacted particles which are seated on the plate remained minimum. Finally, the particles 104-2 are collected on a filter (not shown in the figure) at the end of the impactor assembly.

Figure 2:
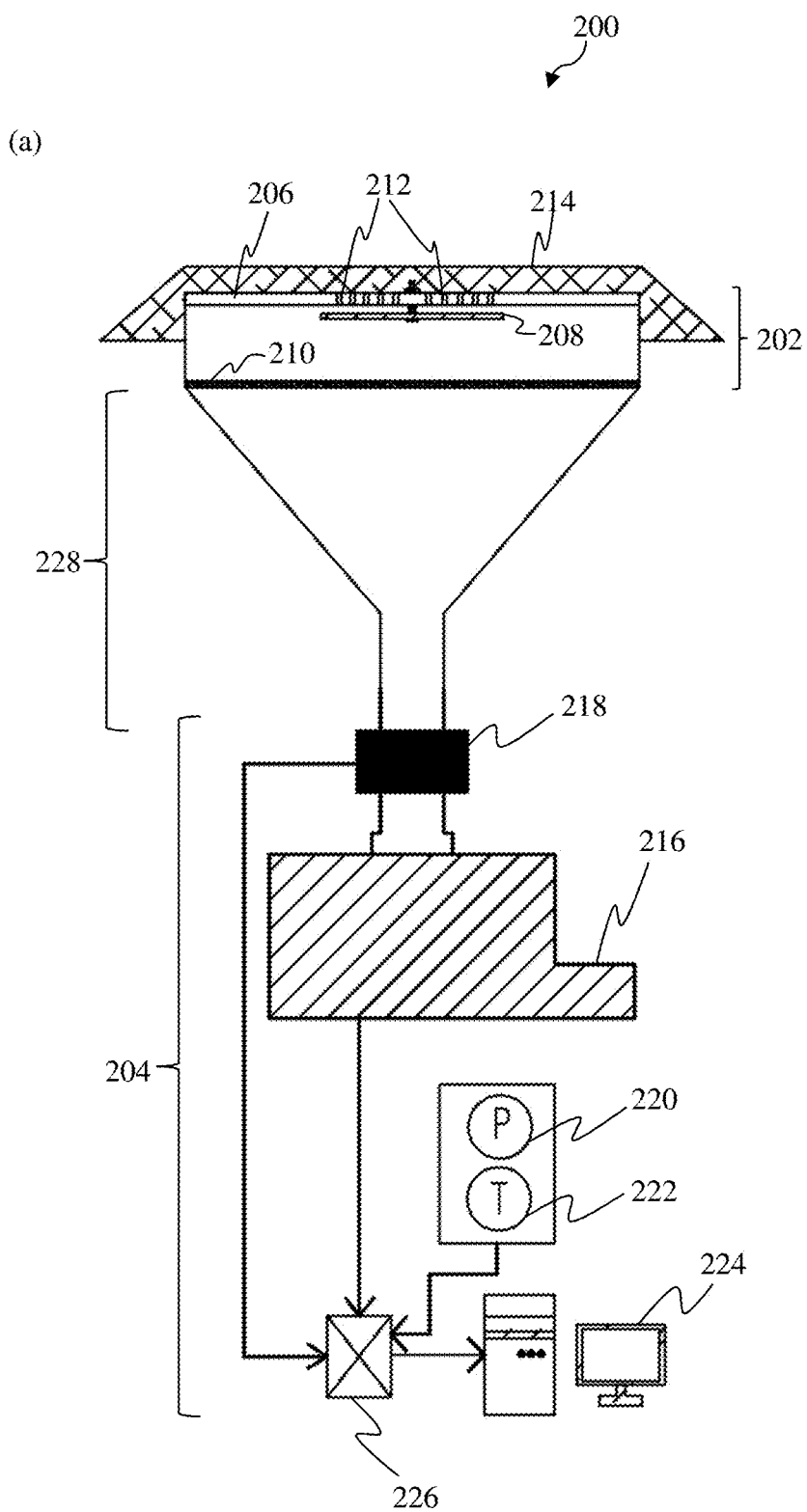
FIG. 2, (a) illustrates a schematic diagram of a sampler apparatus, in accordance with an embodiment of the present subject matter, (b) flow control devices including a volumetric flowmeter 218-1, a hot wire anemometer 218-2, a mass flowmeter 218-3, and a pressure sensor 218-4.
Figure 2:
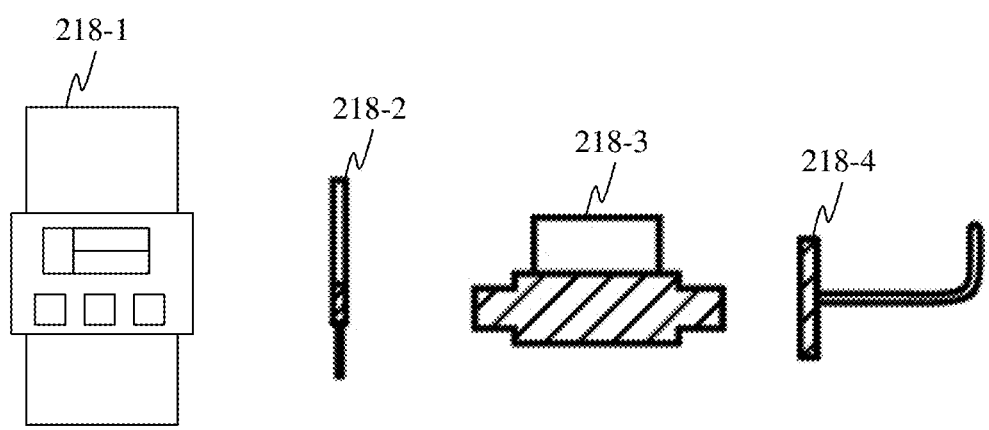

Generally, the impactor assembly is designed based on the impaction theory that combines the parameters for size segregation of particles based on Stokes number, as provided below in equation 1:

$$D_{50} = \left(\frac{9n\pi\mu w^3 Stk_{50}}{4\delta_p C_c Q}\right) \quad (1)$$

where, $D_{50}$=aerodynamic diameter, n=number of circular nozzle, $\mu$=viscosity of air, w=nozzle diameter, $Stk_{50}$=stokes number at $D_{50}$ cut-off diameter, $\delta_p$=aerodynamic particle density, $C_c$=slip correction factor, Q=flow rate FIG. 2, (a) illustrates a sampler apparatus 200, in accordance with an embodiment of the present subject matter. In an example, the sampler apparatus 200 is a high-volume $PM_{2.5}$ sampler. That is, the sampler apparatus 200 facilitates mass and chemical analysis possible of $PM_{2.5}$ collected on filter in short period of sampling time.

According to an example, the sampler apparatus 200 includes an impactor assembly 202 and a control assembly 204. The impactor assembly 202 includes a nozzle plate 206, an impaction plate 208, and a filter unit 210. In an example, the nozzle plate 206 includes a plurality of nozzles 212. Although the written description includes references to nozzles, as may be appreciated, orifices, holes, openings, perforations, and other suitable similar means may be provided on the nozzle plate 206. In an example, the filter unit 210 may include a filter and a filter support screen. In an example, the filter may be of dimension 8×10 inches. In an example, the filter support screen may be a metallic mesh to support the filter.

The impactor assembly 202 further includes a protective mesh 214. In an example, the protective mesh 214 is adapted to be coupled to the nozzle plate 206 such that the protective mesh 214 at least partially covers a surface of the nozzle plate 206. As shown in the figure, the protective mesh 214 covers an entire top surface of the nozzle plate 206 for preventing any insect, other foreign matter, and also to prevent nozzle plate 206 from raindrops.

The control assembly 204 includes an air pump 216, one or more flow control devices 218, a pressure sensor 220, a temperature sensor 222, a controller 224, and a speed regulator/regulator 226. The one or more flow control devices 218, in an example, may include at least one of a volumetric flowmeter, a hot wire anemometer, a mass flowmeter, a pressure sensor, and a pitot tube device. In an example, the pressure sensor 220 is a barometric pressure sensor and is adapted to determine ambient pressure around the sampler apparatus 200. In an example, the temperature sensor 222 is adapted to determine ambient temperature around the sampler apparatus 200. Although the figure illustrates the controller 224 as a desktop, the same should not be construed as a limitation. Examples of the controller 224 may include a laptop, a smartphone, a processor, a microcontroller, a tablet, and the like. Furthermore, as may be understood, one or more components of the control assembly 204 may be interconnected with each other using appropriate means of communication including wired and wireless means.

In an example, the impactor assembly 202 is adapted to be coupled to the control assembly 204 using a tapered section 228. In an example, the tapered section 228 comprises a conical section and a straight linear/cylindrical section, as shown in the figure.

In operation, when the air pump 216 is switched on, an air stream enters into the sampler apparatus 200 through the nozzles 212 provided on the nozzle plate 206. In an example, a speed of the air pump 216 is configured in a manner such that the air stream enters into the sampler apparatus 200 at a predetermined air flow rate. In an example, the speed of the air pump is set such that the air flow rate is 1130 litre per minute (lpm). As mentioned above, the protective mesh 214 prevents the entry of insects, foreign matter, raindrops, and the like, into the sampler apparatus 200. The nozzles 212 channel the air stream through the sampler apparatus 200.

In an example, the impaction plate 208 is adapted to collect particulate matter (PM) present in the air stream that has a size equal to or greater than a threshold size. In an example, the threshold size may be 2.5 micrometre (µm). In said example, the PMs that have size lesser than or equal to 2.5 µm do not get deposited on the impaction plate 208 and passes along with the air stream further into the sampler apparatus 200.

In an example, the filter unit 210 is adapted to collect the PMs that have size less than or equal to the threshold size. That is, the PMs having size less than or equal to 2.5 µm get collected over the filter of the filter unit 210.

In an example, the flow control devices 218 are adapted to maintain the air flow rate within the sampler apparatus 200. Details of the operation of the flow control devices 218 will now be described with reference to FIG. 2(b). FIG. 2, (b) illustrates flow control devices, such as a volumetric flowmeter 218-1, a hot wire anemometer 218-2, a mass flowmeter 218-3, and a pressure sensor 218-4. In an example, the pressure sensor 218-4 may be replaced by or provided with a pitot tube.

The following description relates to maintenance of the air flow at the predetermined rate using the flow control devices 218.

In an example, the volumetric flowmeter 218-1 is adapted to determine a real-time air flow rate of the air stream within the sampler apparatus 200. The real-time air flow rate, as determined in this example, is volumetric air flow rate. That is, the air flow rate is the air flow rate calculated as per the ambient temperature and pressure values. The real-time air flow rate, as determined, is then transmitted to the controller 224 by the volumetric flowmeter 218-1. The controller 224 then ascertains whether the real-time air flow rate is equal to the predefined air flow rate. In a case where the real-time air flow rate is not equal to the predefined air flow rate, the controller 224 provides a control input to the speed regulator 226 for adjusting the real-time air flow rate such that the real-time air flow rate becomes equal to the predetermined air flow rate. The speed regulator 226, on receiving the control input, adjusts the speed of the air pump 216 such that the real-time air flow rate becomes equal to the predetermined air flow rate.

In another example, the hot wire anemometer 218-2 is adapted to determine a real-time velocity of air stream. The real-time velocity, as determined, is then transmitted to the controller 224 by the hot wire anemometer 218-2. The controller 224 then ascertains whether the real-time velocity is equal to a predefined velocity. In a case where the real-time velocity is not equal to the predefined velocity, the controller 224 provides a control input to the speed regulator 226 for adjusting a real-time air flow rate of the air stream within the sampler apparatus 200 such that the real-time air flow rate becomes equal to the predetermined air flow rate. The speed regulator 226, on receiving the control input, adjusts the speed of the air pump 216 such that the real-time air flow rate becomes equal to the predetermined air flow rate.

In yet another example, the mass flowmeter 218-3 is adapted to determine a real-time air flow rate of the air stream within the sampler apparatus 200. The real-time air flow rate, as determined, is then transmitted to the controller 224 by the mass flowmeter 218-3. The controller 224 then ascertains whether the real-time air flow rate is equal to the predefined air flow rate. In a case where the real-time air flow rate is not equal to the predefined air flow rate, the controller 224 provides a control input to the speed regulator 226 for adjusting the real-time air flow rate such that the real-time air flow rate becomes equal to the predetermined air flow rate. The speed regulator 226, on receiving the control input, adjusts the speed of the air pump 216 such that the real-time air flow rate becomes equal to the predetermined air flow rate.

In yet another example, the pressure sensor 218-4 is adapted to determine a real-time pressure within the sampler apparatus 200. The real-time pressure, as determined, is then transmitted to the controller 224 by the pressure sensor 218-4. The controller 224 then ascertains whether the real-time pressure is equal to the predefined pressure. In a case where the real-time pressure is not equal to the predefined pressure, the controller provides a control input to the speed regulator 226 for adjusting a real-time air flow rate of the air stream within the sampler apparatus 200 such that the real-time air flow rate becomes equal to the predetermined air flow rate. The speed regulator 226, on receiving the control input, adjusts a speed of the air pump 216 such that the real-time air flow rate becomes equal to the predetermined air flow rate.

In an example, the controller 224 is adapted to receive the ambient pressure value and the ambient temperature value from the pressure sensor 220 and the temperature sensor 222, respectively. Using the ambient pressure value and the ambient temperature, the controller 224 may display the air flow rate as per either the standard temperature pressure conditions or the volumetric air flow as per the ambient temperature-pressure conditions.

As described above, the flow control devices 218 maintain the air flow rate of the air stream within the sampler apparatus 200. Maintenance of the air flow rate facilitates in ensuring that only PMs with size less than or equal to 2.5 µm are deposited on the filter of the filter unit 210. Furthermore, reduction in the air flow that causes deposition of PMs greater than 2.5 µm to be deposited on the filter rate is averted. As a result, the accuracy of readings is increased.

Furthermore, the sampler apparatus 200 is able to collect PMs less than equal to 2.5 micrometre filter samples at the same time for further analysis, such as gravimetric analysis, organic carbon analysis, elemental carbon analysis, metallic element analysis, ionic analysis, etc. Thus, the inaccuracy resulting from cutting the filter paper is averted.

Furthermore, by implementing the high capacity sampler apparatus 200, multiple analysis, as mentioned above, may be performed using a single filter. Thus, the need to implement a plurality of small samplers with small filters is averted. Thus, the sampler apparatus 200, as described herein, is cost-efficient.

Figure 3:
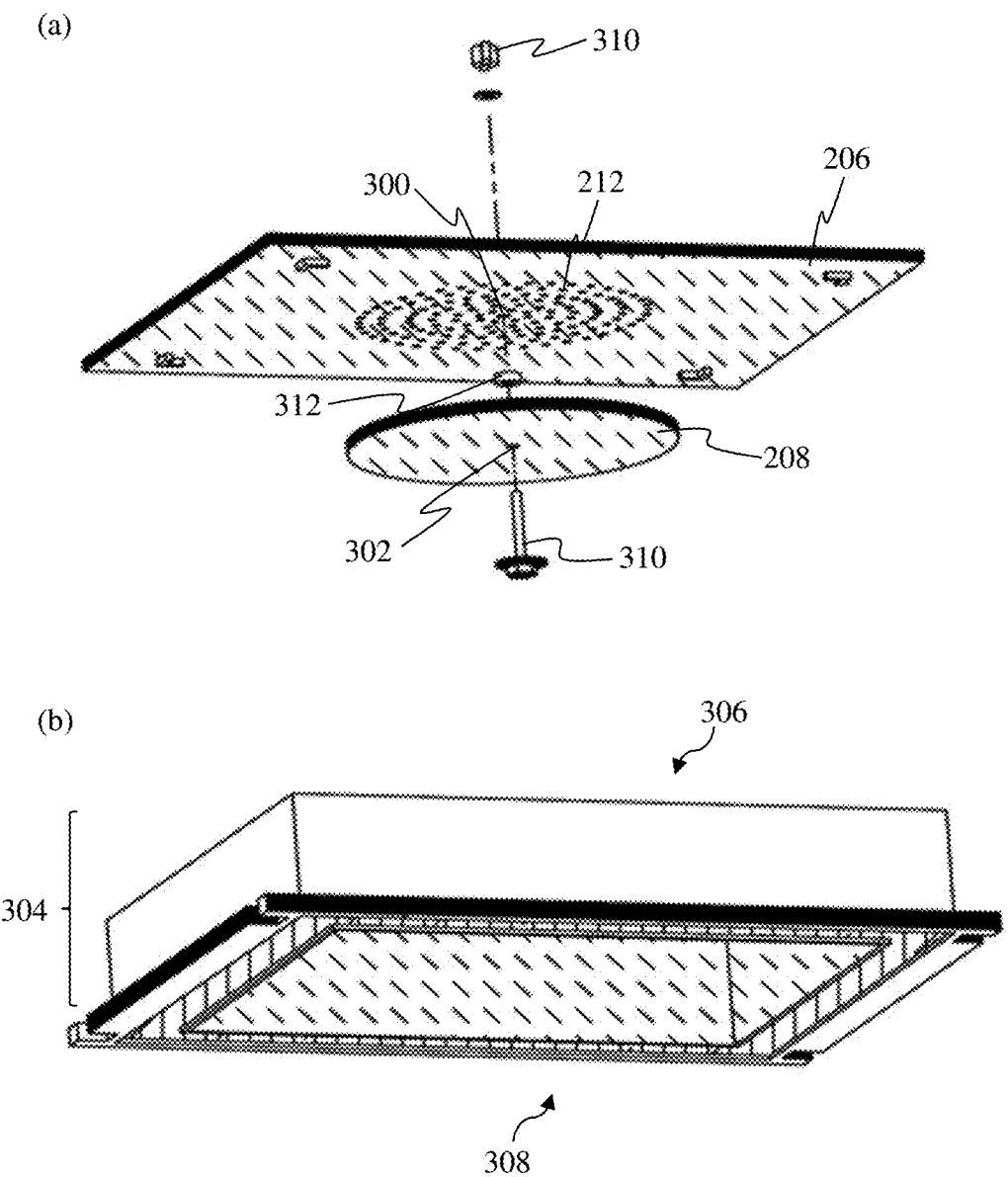
FIG. 3, (a) illustrates an exploded view of an impactor assembly, according to an embodiment of the present subject matter, (b) illustrates an impactor assembly and a housing.

FIG. 3, (a) illustrates an exploded view of the impactor assembly 202, according to an embodiment of the present subject matter. As shown in the figure, the impactor assembly 202 includes the nozzle plate 206 comprising the nozzles 212 and the impaction plate 208. The nozzle plate 206 includes a first hole 300 and the impaction plate 208 includes a second hole 302. For the sake of brevity, the filter unit 210 is not shown in this figure.

FIG. 3, (b) The impactor assembly 202 further includes a housing 304 defined by a plurality of lateral surfaces, a first open end 306, and a second open end 308.

In an example, the first open end 306 is adapted to be coupled to the nozzle plate 206. In an example, the first open end 306 includes a groove and a rubber gasket along its periphery for facilitating coupling of the nozzle plate 206 with the first open end 306.

Furthermore, the impaction plate 208 is disposed within the housing 304 such that the first hole 300 and the second hole 302 are concentric. In said case, the impaction plate 208 is coupled with the nozzle plate 206 using a fastening means 310. In an example, the fastening means 310 may be a combination of one or more elements, such as a screw and a nut. Furthermore, in an example, a spacer 312 is provided between the nozzle plate 206 and the impaction plate 208.

Further, in an example, the second open end 308 is adapted to be coupled to the filter unit 210 (not shown in the figure). In an example, the second open end 308 includes a groove and a rubber gasket along its periphery for facilitating coupling of the filter unit 210 with the second open end 308.

Figure 4:
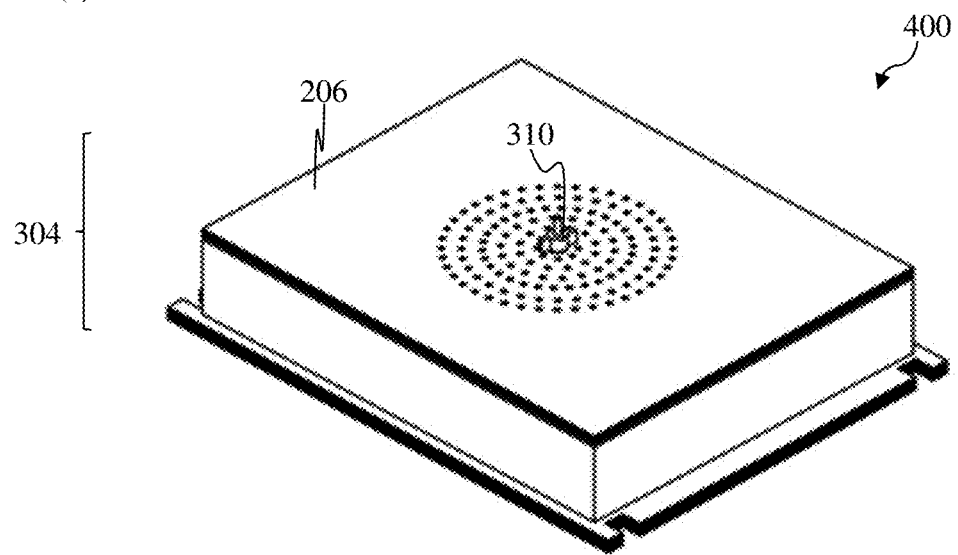
FIGS. 4, (a) and (b) illustrate isometric views of a housing of an impactor assembly, according to an embodiment of the present subject matter.
Figure 4:
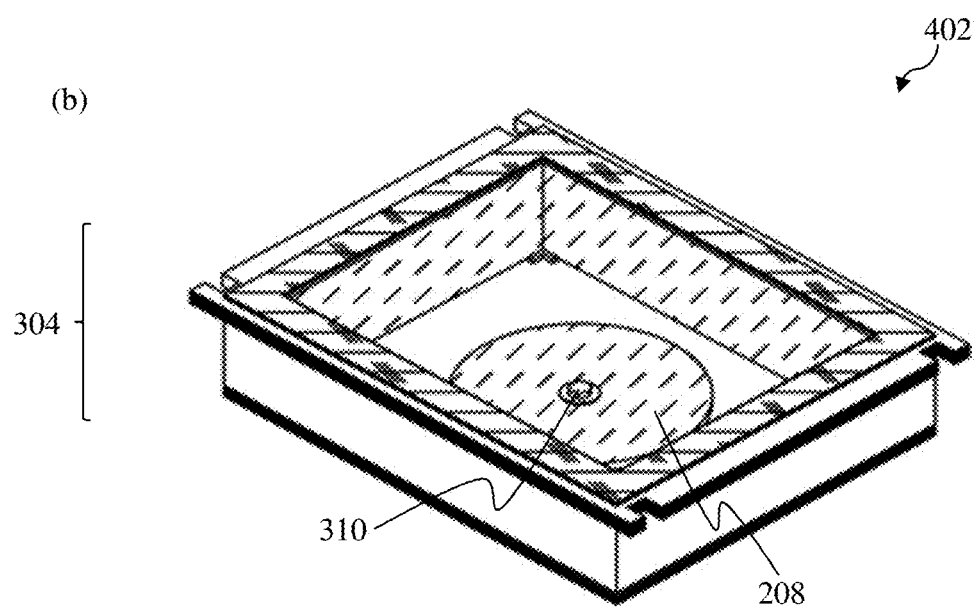

FIGS. 4, (a) and (b) illustrate isometric views 400 and 402, respectively, of the housing 304 of the impactor assembly 202, according to an embodiment of the present subject matter. As shown in the isometric view 400, the nozzle plate 206 is coupled to the housing 304. Furthermore, the fastening means 310 is used to couple the nozzle plate 206 with the impaction plate 208 (not shown in this view). As shown in the isometric view 402, the impaction plate 208 is coupled to the housing 304. Furthermore, the fastening means 310 is used to couple the impaction plate 208 with the nozzle plate 206 (not shown in this view).

Figure 5:
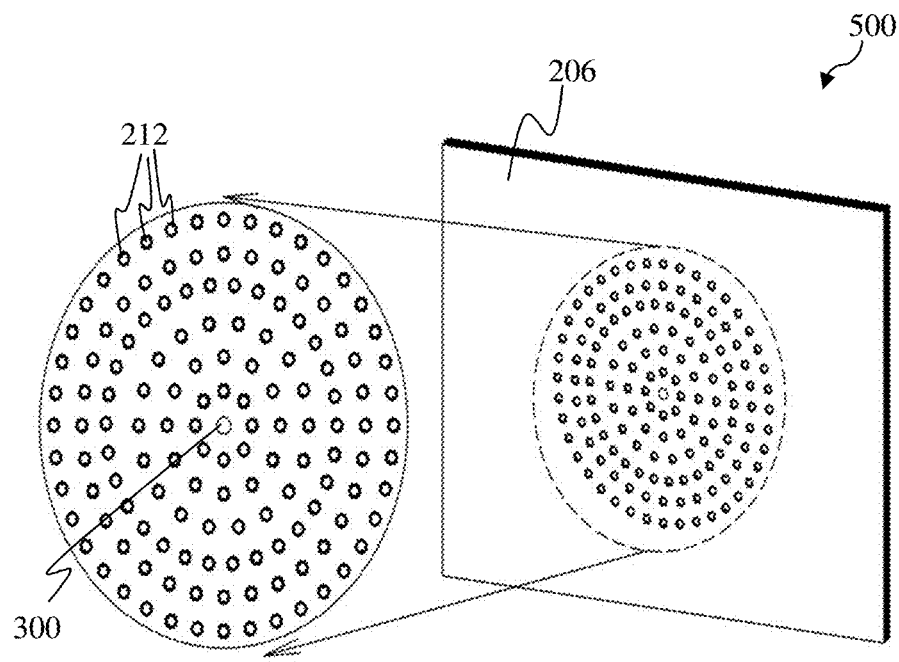
FIG. 5 illustrates a dimetric view of a nozzle plate, according to an embodiment of the present subject matter.

FIG. 5 shows a dimetric view 500 of the nozzle plate 206, according to an embodiment of the present subject matter.

The nozzle plate 206 includes a plurality of nozzles 212 and the hole 300. The structure of the nozzle plate 206 is rectangular, and, in an example, is equivalent to the filter (8×10 inches) of the filter unit 210. From the hole 300, the fastening means 310 is fitted. The nozzles 212 are tapered type and the configuration of nozzles 212 is designed in such a way that the separation of PMs should be sharp, minimized particle losses and optimized air mass flow with less deflection in streamlines.

Figure 6:
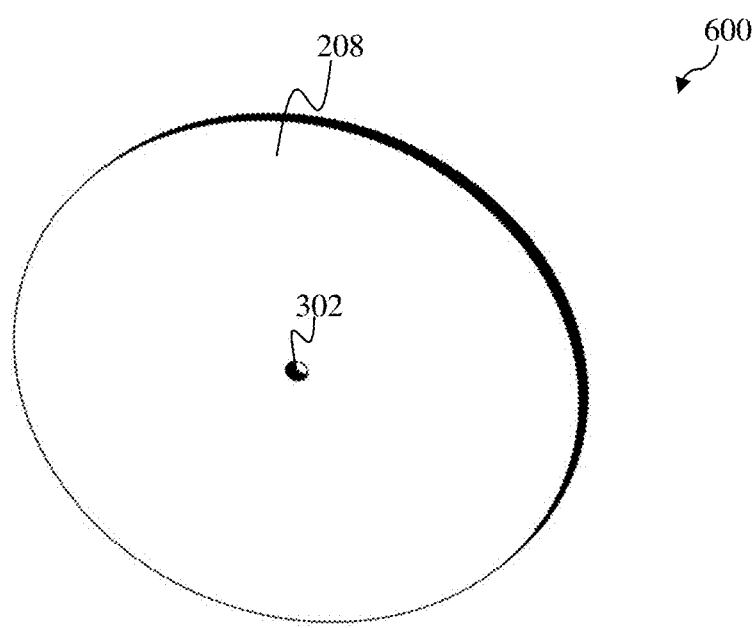
FIG. 6 illustrates a dimetric view of an impaction plate, according to an embodiment of the present subject matter.

FIG. 6 shows a dimetric view 600 of the impaction plate 208, according to an embodiment of the present subject matter. The impaction plate 208 includes the hole 302. In an example, the PMs having size greater than 2.5 micrometres are trapped on the surface of the impaction plate 208 by high vacuum grease. In an example, the impaction plate 208 has a diameter of 130 mm and is fixed with nozzle plate 206 through the fastening means 310 that passes through the hole 302. In an example, the impaction plate 208 is separated from the nozzle plate 206 using the spacer 312. In an example, the internal diameter of the spacer 312 is equivalent to the diameter of the fastening means 310.

Experimental Results

Figure 7:
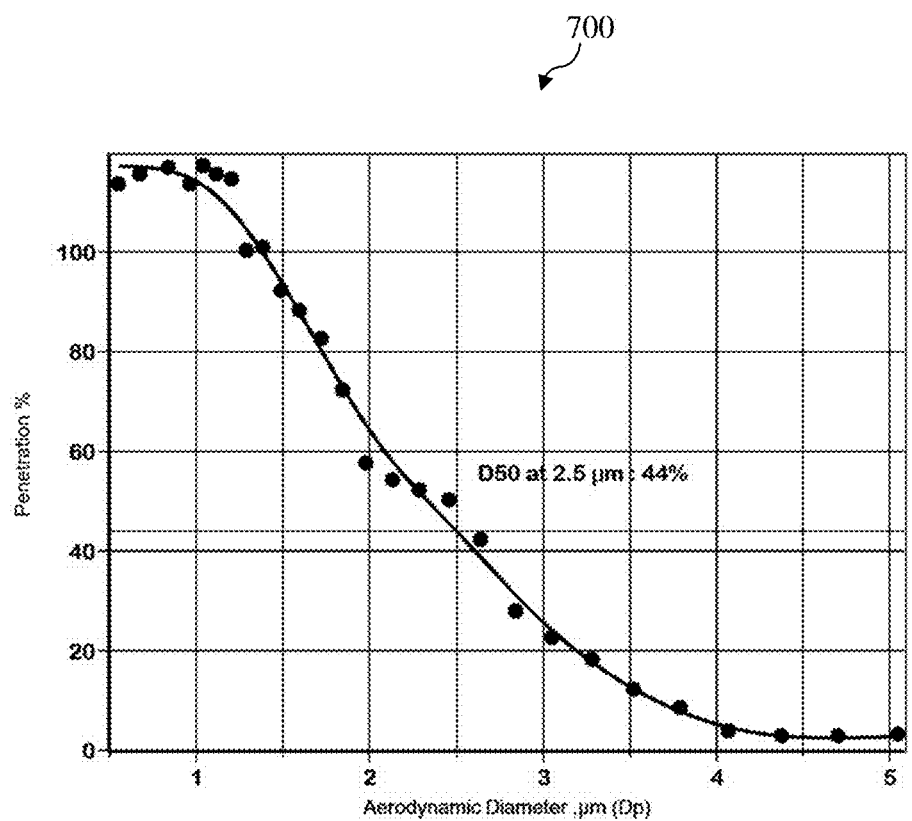
FIG. 7 illustrates a graph 700 depicting results of an evaluation of a sampler apparatus, in accordance with an embodiment of the present subject matter.

The Sampler apparatus 200 was evaluated for its particle size distribution by aerodynamic particle sizer (APS spectrometer, Model 3321, TSI Inc., USA). The result of the evaluation is described below in reference to FIG. 7 that illustrates a graph 700 depicting the results of the evaluation.

The ambient air and $PM_{2.5}$ (particulate matter having size equal to or less than 2.5 micrometre) number of particles were measured by attaching/detaching the impactor. The penetration efficiency was then calculated using following equation:

$$Penetration_{Impactor} = \frac{N_{Impactor\ in}}{N_{Ambient\ air}}$$

Where, N is the number of particles.

The preliminary results show the penetration of impactor at 2.5 μm is 45% closer to 50%. The $D_{50}$ lies at 2.46 μm and its results are comparable.

The Geometrical size distribution (GSD) which signifies sharpness of $D_{50}$ cut is calculated as:

$$GSD = \sqrt{\frac{D_{16}}{D_{84}}}$$

where, $D_{16}$ and $D_{84}$ are particle diameter at 16% and 85% diameter, respectively.

The preliminary result shows that the penetration efficiency at 2.5 μm is 45%. The $D_{50}$ and GSD lies at 2.46 μm and 1.44 respectively. Both results are comparable to 3 hole WINS impactor that is consist of flat greased plate has $D_{50}$ of 2.4 μm and GSD of 1.30 (Thomas M. Peters, Robert W. Vanderpool, and Russell W. Wiener, Design and Calibration of the EPA $PM_{2.5}$ Well Impactor Ninety-Six (WINS), Aerosol Science and Technology, 34:5, 2001, 389-397).

In the reference method of Code of Federal Regulations (CFR) of Environmental Protection Agency (EPA), USA, it is mentioned that the flow rate of size selective inlet should be 1.000 m³/h (16.67 lpm), and filter size (diameter) where the particles collected on should be 35-37 mm. Therefore, while using reference method, a highly sensitive balance is required to weigh low mass of this small filter and particulate mass collected due to low flow rate. Electrostatic charge on the filter further adds the uncertainty in the $PM_{2.5}$ measurements.

Alternatively, an equivalent method can be used to overcome such issues. In view of this, the current invention involves the designing of $PM_{2.5}$ impactor. This impactor (FIG. 1) can segregate particulate matter >2.5-micron size and facilitate to collect <2.5-micron size particles suspended in ambient air on filter size 8 inch×10 inch. The impactor is designed for sampling air with a high flow rate (1.13 m³/min, i.e. 40 cfm). For high-volume $PM_{10}$ (also for TSP) sampler, CFR EPA USA has been recommended a flow rate of 40 cfm. Also, the design of this impactor is made such as a retrofit on the filter holder of conventional high-volume total suspended particulate matter (TSPM) reference sampler to make it high-volume $PM_{2.5}$ sampler.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A sampler apparatus comprising:
    an impactor assembly comprising:
        a nozzle plate comprising a plurality of nozzles for channelling an air stream through the sampler apparatus;
        a protective mesh directly coupled to the nozzle plate such that the protective mesh entirely covers a top surface of the nozzle plate;
        an impaction plate configured to collect particulate matter having size equal to or greater than a threshold size;
        a filter unit configured to collect particulate matter having size less than or equal to the threshold size; and
    a control assembly coupled with the impactor assembly, the control assembly comprising one or more flow control devices to maintain a determined air-flow rate of the air stream within the sampler apparatus.

2. The sampler apparatus as claimed in claim 1, wherein the control assembly further comprises a controller, a speed regulator, and an air pump, and wherein the one or more flow control devices comprises at least one of a pressure sensor, a pitot tube, a hot wire anemometer, a mass flowmeter, and a volumetric flowmeter.

3. The sampler apparatus as claimed in claim 1, wherein:
    The one or more flow control devices comprise a pressure sensor, wherein the pressure sensor is configured to determine a real-time pressure within the sampler apparatus;
    the controller is configured to:
        ascertain whether the real-time pressure is equal to a defined pressure; and
        if the real-time pressure is not equal to the defined pressure, provide a control input to the speed regulator for adjusting a real-time air flow rate of the air stream within the sampler apparatus such that the real-time air flow rate becomes equal to the determined air flow rate; and the speed regulator is configured to:
receive the control input; and
adjust a speed of the air pump such that the real-time air flow rate becomes equal to the determined air flow rate.

4. The sampler apparatus as claimed in claim 1, wherein:
The one or more flow control devices comprise a hot wire anemometer, wherein the hot wire anemometer is configured to determine a real-time velocity of air stream;
the controller is configured to:
ascertain whether the real-time velocity is equal to a defined velocity; and
if the real-time velocity is not equal to the defined velocity, provide a control input to the speed regulator for adjusting a real-time air flow rate of the air stream within the sampler apparatus such that the real-time air flow rate becomes equal to the determined air flow rate; and
the speed regulator is configured to:
receive the control input; and
adjust a speed of the air pump such that the real-time air flow rate becomes equal to the determined air flow rate.

5. The sampler apparatus as claimed in claim 1, wherein:
the one or more flow control devices comprise a mass flowmeter, wherein the mass flowmeter is configured to determine a real-time air flow rate of the air stream within the sampler apparatus; and
the controller is configured to:
ascertain whether the real-time air flow rate is equal to the defined air flow rate; and
if the real-time air flow rate is not equal to the defined air flow rate, provide a control input to the speed regulator for adjusting the real-time air flow rate such that the real-time air flow rate becomes equal to the predetermined determined air flow rate; and
the speed regulator is configured to:
receive the control input; and
adjust a speed of the air pump such that the real-time air flow rate becomes equal to the determined air flow rate.

6. The sampler apparatus as claimed in claim 1, wherein:
the one or more flow control devices comprise a volumetric flowmeter, wherein the volumetric flowmeter is configured to:
determine a real-time air flow rate of the air stream within the sampler apparatus; and
the controller is configured to:
ascertain whether the real-time air flow rate is equal to the defined air flow rate; and
if the real-time air flow rate is not equal to the defined air flow rate, provide a control input to the speed regulator for adjusting the real-time air flow rate such that the real-time air flow rate becomes equal to the determined air flow rate; and
the speed regulator is configured to:
receive the control input; and
adjust a speed of the air pump such that the real-time air flow rate becomes equal to the determined air flow rate.

7. The sampler apparatus as claimed in claim 1, wherein the nozzle plate further comprises a first hole, wherein the impaction plate comprises a second hole, and wherein the impactor assembly further comprises a housing defined by a plurality of lateral surfaces, a first open end, and a second open end, wherein:
the first open end is coupled to the nozzle plate;
the impaction plate is disposed within the housing such that the first hole and the second hole are concentric, wherein the impaction plate is coupled with the nozzle plate using a fastening means, and wherein a spacer is provided between the nozzle plate and the impaction plate; and
the second open end is coupled to the filter unit.

8. The sampler apparatus as claimed in claim 1, wherein the control assembly further comprises a flow meter configured to display at least one of a standard air flow rate of the air stream and a volumetric airflow rate of the air stream, wherein the standard air flow rate is the air flow rate as per standard conditions, and wherein the volumetric airflow rate is the air flow rate as per ambient conditions.

9. The sampler apparatus as claimed in claim 1, wherein the filter unit comprises:
a filter; and
a filter support screen to support the filter.

10. The sampler apparatus as claimed in claim 1, wherein the impactor assembly is coupled to the control assembly by a tapered section.

\* \* \* \* \*